United States Patent
Heine (10) Patent No.: US 10,518,224 B2
(45) Date of Patent: Dec. 31, 2019

(54) METHOD AND APPARATUS FOR FILTERING AND SEPARATING FLOW MEDIA BY MEANS OF MEMBRANES

(71) Applicant: Wilhelm Heine, Hamburg (DE)

(72) Inventor: Wilhelm Heine, Hamburg (DE)

(73) Assignee: R.T.S. ROCHEM TECHNICAL SERVICES GMBH, Hamburg (DE)

( * ) Notice: Subject to any disclaimer, the term of this patent is extended or adjusted under 35 U.S.C. 154(b) by 865 days.

(21) Appl. No.: 14/076,456

(22) Filed: Nov. 11, 2013

(65) Prior Publication Data
US 2015/0129500 A1 May 14, 2015

(51) Int. Cl.
| | | |
|---|---|---|
| *B01D 69/12* | (2006.01) | |
| *B01D 61/14* | (2006.01) | |
| *B01D 61/36* | (2006.01) | |
| *B01D 63/12* | (2006.01) | |
| *B01D 61/02* | (2006.01) | |

(52) U.S. Cl.
CPC ........... *B01D 69/12* (2013.01); *B01D 61/145* (2013.01); *B01D 61/362* (2013.01); *B01D 63/12* (2013.01); *B01D 61/025* (2013.01); *B01D 2311/14* (2013.01); *B01D 2313/14* (2013.01)

(58) Field of Classification Search
None
See application file for complete search history.

(56) References Cited

U.S. PATENT DOCUMENTS

| | | | | |
|---|---|---|---|---|
| 6,524,478 | B1* | 2/2003 | Heine | B01D 61/18 210/232 |
| 2004/0154971 | A1* | 8/2004 | Heine | B01D 63/10 210/321.74 |
| 2006/0273001 | A1* | 12/2006 | Heine | B01D 63/084 210/450 |
| 2013/0118978 | A1* | 5/2013 | Dufresne | C02F 1/441 210/641 |

OTHER PUBLICATIONS

"Nanofiltration and Reverse Osmosis (NF/RO)", (Hereinafter "NF/RO", American Membrane Technology Association, FS-3, Feb. 2007, 2 pages.*

* cited by examiner

*Primary Examiner* — Jonathan M Peo
(74) *Attorney, Agent, or Firm* — Bacon & Thomas, PLLC

(57) ABSTRACT

A method and an apparatus (10) for filtering and separating flow medium (11) by means of membranes (13), in a substantially pressuretight housing (14), at least one inlet (15) for the flow medium (11) to be separated, and at least one outlet (16) for permeate (18) discharge and an outlet (17) for discharged retentate (19), is described. The membranes (13) being embodied as membrane cushions, which have an opening region (131) for emergence of permeate (18) collecting in the membrane interior (137). Various partial sets of the set of membranes (13), which form a membrane stack (12), utilize different separation techniques based on the flow medium (11) so that a respective partial set are each operated with a predetermined, different pressure of the medium (11) to be separated or with a different vacuum on the permeate side of the membranes (13).

17 Claims, 8 Drawing Sheets

Fig. 6
Section A-B

Fig. 7
Section A-B

METHOD AND APPARATUS FOR FILTERING AND SEPARATING FLOW MEDIA BY MEANS OF MEMBRANES

BACKGROUND OF THE INVENTION

The invention relates to a method for filtering and separating flow media by means of membranes, including a substantially pressuretight housing in which a plurality of membranes is disposed, at least one inlet for the flow medium that is carried into the apparatus and that is to be separated, and at least one outlet for the permeate discharged from the apparatus and for the discharged retentate, the membranes being embodied on the order of membrane cushions, which have an opening region for the emergence of the permeate collecting in the membrane interior, and to an apparatus for filtering and separating flow media by means of membranes, including a substantially pressuretight housing in which a plurality of membranes is disposed, at least one inlet for the flow medium carried into the apparatus and to be separated, and at least one outlet for the permeate discharged from the apparatus and an outlet for the discharged retentate, the membranes being embodied on the order of membrane cushions, which have an opening region for the emergence of the permeate collecting in the membrane interior.

A method and an apparatus with which such a method can be performed is described for instance in European patent application EP A 1 445 013, where the apparatus is embodied in conjunction with an actual separator unit embodied in the form of a so-called winding membrane, which can be received in a pressuretight housing.

The membrane elements used there, which are commonly embodied in the form of so-called membrane cushions, which in the profession are also called a cushion membrane or membrane pockets, are adapted to the particular separation purpose with regard to the medium to be separated, and also with regard to its size (membrane surface area), and the actual substance-selective membranes that form the membrane cushions are likewise selected specifically for the separation purpose for the medium to be separated.

In pressure-driven separation techniques using pressure, a distinction is made among filtration, ultrafiltration, nanofiltration, and reverse osmosis. These pressure-driven separation techniques partly overlap, so that in the profession, a strict separation is considered only theoretically, with a view to the operative physical mechanism of the substance separation taking place in a membrane. Nevertheless, the aforementioned approximate classification—see *Membrantrennverfahren, Ultrafiltration and Umkehrosmose* [Membrane Separation Methods, Ultrafiltration and Reverse Osmosis] by Robert Rautenbach, published by Salle+Sauerländer in 1981—is commonly employed.

Substance separation by means of membranes has gained entry into nearly all areas of commercial business and extends for instance from substance separation in marine equipment, such as ships and drilling platforms that are set up or anchored on the sea, to the field of seawater desalination for producing water for industrial use and fresh water and for instance to the separation of water leaching out from garbage dumps or from commercial and community wastewater treatment, plants.

Many of these liquid flow media are composed of a varied mixture of different liquid components, sometimes even mixed with gaseous components, for which until now, for every desired separation product after it has gone through a separation method, a particular apparatus with which a separation method can be performed, or a product-specific separation device, has had to be furnished. As can readily be appreciated, this entails not only considerable expense for equipment but also complicated controls for the methods that must be used or performed for separating a complex mixture of substances. Many of the substances to be separated from a mixture of substances have to be separated out from a mixture of substances to be separated by using different separation mechanisms as in the above classification when a particular method for separating certain substances from the mixtures of substances to be separated is unsuitable, and only a different method leads to success. Until now, even for different substances in a substance mixture that belong to the same group of substances chemically and/or physically that are to separated out from the total mixture, separation was possibly only by one method of substance separation, but not by another.

Another factor, as already indicated above, is that until now, with flow media of complex composition, separation of the intermediate products can be achieved by repeated passages in succession through apparatuses that are each directed to the particular desired product to be separated. Not only does this entail the aforementioned great expense for equipment; it is also very time-consuming and requires a considerable expenditure of energy.

It is therefore the object of the invention to create a method with which various products, which are each accessible only to different separation mechanisms, can be separated in a single method operation from a substance mixture that is complicated to separate, and the method entails little expense for equipment, and an apparatus with which such a method can be performed does not need to be retrofitted, and hence the method can be performed quickly and economically.

SUMMARY OF THE INVENTION

This object is attained in a first version of the invention in that in the membrane stack a respective partial set of membranes of different separation areas or techniques can each be operated with a predetermined, different pressure of the medium to be separated, and in a second version of the invention in that in the membrane stack, a respective partial set of membranes of different separation areas or types can each be operated with different pressures of the medium to be separated.

The latter of the two versions, both of them extraordinarily advantageous, that attain the object of the invention also makes it possible for instance for substances that can be separated only by means of membranes that work by the method of pervaporation, for example, to be separated from complex substance mixtures.

The advantage of the versions that attain the object of the invention with regard to the various separation methods is that, as sought in accordance with the object of the invention, a selective substance separation, that is, one that is selective for the particular desired product from the substance mixture to be separated, is possible in virtually a single method step, dictated by the different separation areas selected for the individual partial sets of the set of all the membrane elements acted upon. As a result, the separation method that previously had to be employed many times is reduced in principle to a single separation method. As sought, this is not only a major advantage in terms of equipment but also an advantage that is expressed in the saving of both time and expense.

In principle, the same advantage is also attained in the proposed version of the invention in which the substance separation process is performed by means of underpressure (vacuum), or in other words by means of the method in which a separation of certain substance mixtures is possible only by means of underpressure on the permeate side of a membrane element.

In an advantageous refinement of the invention, a predeterminable partial set of the set of membranes of the membrane stack is operated with different pressures of the medium to be separated; that is, a given set of membrane elements of a membrane stack is responsible for only the one separation task or the one separation area, while another partial set of the set of membranes of the membrane stack is specified for other separation areas of the medium to be separated. The size of the set of the individual partial sets of the membranes is determined in turn by the set (volume) of the incident flow medium to be separated and of the proportion that can be expected of certain different substances in the total substance mixture that is to be separated.

The same advantageously applies accordingly to substance separation by means of underpressure, in which advantageously, a predeterminable partial set of the set of the membranes of the membrane stack is acted upon by variously high vacuum with regard to the medium to be separated.

It is advantageously also possible to operate the method such that at least one first predeterminable partial set of the set of membranes of the membrane stack is subjected to a differently high vacuum, and at least one second predeterminable partial set of the set of membranes is subjected to different pressure with a view to the medium to be separated.

An apparatus for filtering and separating flow media by means of membranes, with which the aforementioned method for filtering and separating flow media by means of membranes can be performed, is preferably embodied such that respective partial sets of the set of membranes which form a membrane stack are embodied for different separation areas with a view to the flow medium to be separated.

For instance, advantageously, a partial set of the set of the membranes forming the membrane stack comprises those which are suitable for instance for nanofiltration, while another partial set of membranes comprises those that are amenable to separation by the principle of reverse osmosis, and still another set of membranes of the membrane stack comprises those that are embodied for separation by the principle of ultrafiltration, and this list of different sets of membranes for different separation areas is understood here to be merely examples; all other membranes that are not expressly named here can form various partial sets of membranes of the membrane stack. Precisely the same advantages for the logically identical object of the invention, as described in conjunction with the methods of the invention named at the outset, apply to the apparatus embodied according to the invention.

Although in principle the apparatus of the invention, with regard to the disposition of the membranes in the apparatus, or in the housing belonging to the apparatus, can be suitable selected arbitrarily—that is, in principle, apparatuses in which the membrane elements comprise hollow filaments or capillary membranes are also suitable—it is extraordinarily advantageous to embody the membrane stack on the order of a multilayer spiral. Such membrane stacks are also called spiral modules, and they have the great advantage that in fact, in the traversal of the spirally disposed membranes, the same pressure conditions for the medium that flows through the spiral on the face end pertain at all locations of the membranes A spiral module of this kind, also called a winding module, can hold a larger membrane surface area in the same three-dimensional volume as a stack of membrane elements, for example, in which the medium to be separated takes a meandering course from the inlet for the medium to be separated to the outlet of the retentate from an apparatus.

For the disposition according to the invention of the individual sets of membranes of different separation areas, the embodiment of a spiral module or winding module has the advantage that even then the same pressure conditions of the medium (feed) to be separated prevail at every location on the membrane surface area.

In the membrane separation technique, it is essential that the permeate occurring in the interior of the membrane cushion between the substance-selective membrane elements, or in other words the actual membranes of the membrane cushion, can drain out quickly and without interference. Since in various separation areas for which the membrane is designed the permeate has different flow properties, it is advantageous to optimize these flow properties by disposing at least one intermediate element between the membrane elements in its interior; this intermediate element not only has spacer functions, or in other words not only ensures that both inside surfaces of the membranes of a membrane cushion are kept spaced apart, but also serves to allow the permeate in the interior of the membrane cushion flow out without interference, or in other words unhindered.

It is advantageous that that the substantially planar intermediate element has a different thickness that can be preselected in accordance with the separation area of the membrane cushion, and the thickness is adapted to the selected separation area for which the membrane element is selected or embodied, and it is given an optimized form, to avoid interfering with the outflow of the permeate collecting in the membrane interior.

In order also to ensure the least-hindered possible flow through the membrane stack of the flow medium to be separated, in a further advantageous embodiment of the invention, that spacer elements are disposed between the membrane cushions forming the membrane stack. These spacer elements are meant to ensure that the flow medium to be separated can flow essentially unhindered through the membrane stack. With regard to the flow channel for the medium to be separated through the membrane stack as well, it is highly advantageous that the substantially planar or gridlike spacer element has a different thickness, which can be selected in accordance with the separation area of at least the adjacent membrane cushion on both sides. This thickness of the spacer element is also definitive for the most unhindered possible of the medium to be separated through the membrane stack, and the thickness of the spacer element can be selected in adaptation to the selected separation area of the particular membrane cushion. In this way, once again, easy adaptation, with the goal of achieving an optimal flow of the medium to be separated through the membrane stack, is possible.

In another advantageous embodiment of the invention, the membrane cushions forming the membrane stack are wound onto one another on the order of the spiral around a permeate and collection device extending across the apparatus, in such a manner that the opening region of the membrane cushion is in communication with corresponding permeate drain openings of the permeate draining and collection device. To that end, the permeate draining and collection device has many holes which pass through its tubular casing; the holes are oriented such that they communicate with the permeate drain openings or the permeate drain region of the membrane cushion, and the permeate is able to flow through these holes.

In still another advantageous embodiment of the invention, the membrane stack, embodied on the order of a spiral, is wounded onto a separate tubular element, and the permeate draining and collection device is received in the inner bore of the tubular element. This has the advantage that the spiral module or winding module can be prefabricated such that it is virtually functionally complete and merely has to be slipped onto the tubular element, and in this embodiment separate, permeate draining and collection device. In this embodiment of the apparatus, the tubular permeate draining and collection device can also be used as a central clamping bolt traversing the housing, in order to enable receiving the spiral or winding module in the housing of the apparatus in pressuretight fashion.

As also already indicated at the outset, it is also possible to apply the principle of the invention for the apparatus to membrane stacks of the kind that are formed by a set of alternatingly stacked, disklike spacer elements and membrane cushions. One such apparatus is known for instance from European patent application EP A 0 289 740, which, with basically the same construction, is known in many embodiments in the prior art. The principle of the invention, in terms of an apparatus but also a method, can readily be applied to membrane stacks of that kind as well.

In membrane stacks embodied in that way, which in their effect are analogous to the aforementioned planar spacer elements, which are commonly embodied in gridlike fashion, in order to gain sufficient space above and below the membrane surface for the medium to be separated, a plurality of protrusions protruding away from the surface are advantageously provided on at least one surface, the protrusions being dimensioned in height such that the membrane cushion does not rest with its particular liquid-selective surface on the surfaces of the protrusions, but instead only supports them at a slight distance from the membrane cushion as needed. In another type of protrusions, the protrusions protruding in raised fashion from the surface of the disklike spacer elements are embodied with a small surface area parallel to the surface of the spacer elements, so that the membrane element can be braced on these parallel surfaces of the protrusions in order to avoid damage to the substance-selective membrane surfaces.

In general, preferably the thickness of the spacer elements is defined by the height of the bps.

Finally, in this embodiment of the membrane stack, once again the spacer element can be provided with an outer encompassing edge, each edge protruding from the surface of the spacer element, and the thickness of the spacer element can be defined by the height of the edge of the spacer element.

Thus in this embodiment of the membrane stack, it is ensured that a channel for the medium to be separated is always ensured in a simple way, in adaptation to the height of the protrusions and/or the height of the edge, in accordance with the desired separation area of the medium.

The invention will now be described in detail, referring to the ensuing schematic drawings, in terms of a first exemplary embodiment, and a second exemplary embodiment will be explained only briefly in terms of its modifications compared to the first example.

DETAILED DESCRIPTION OF THE INVENTION

Figure 1:
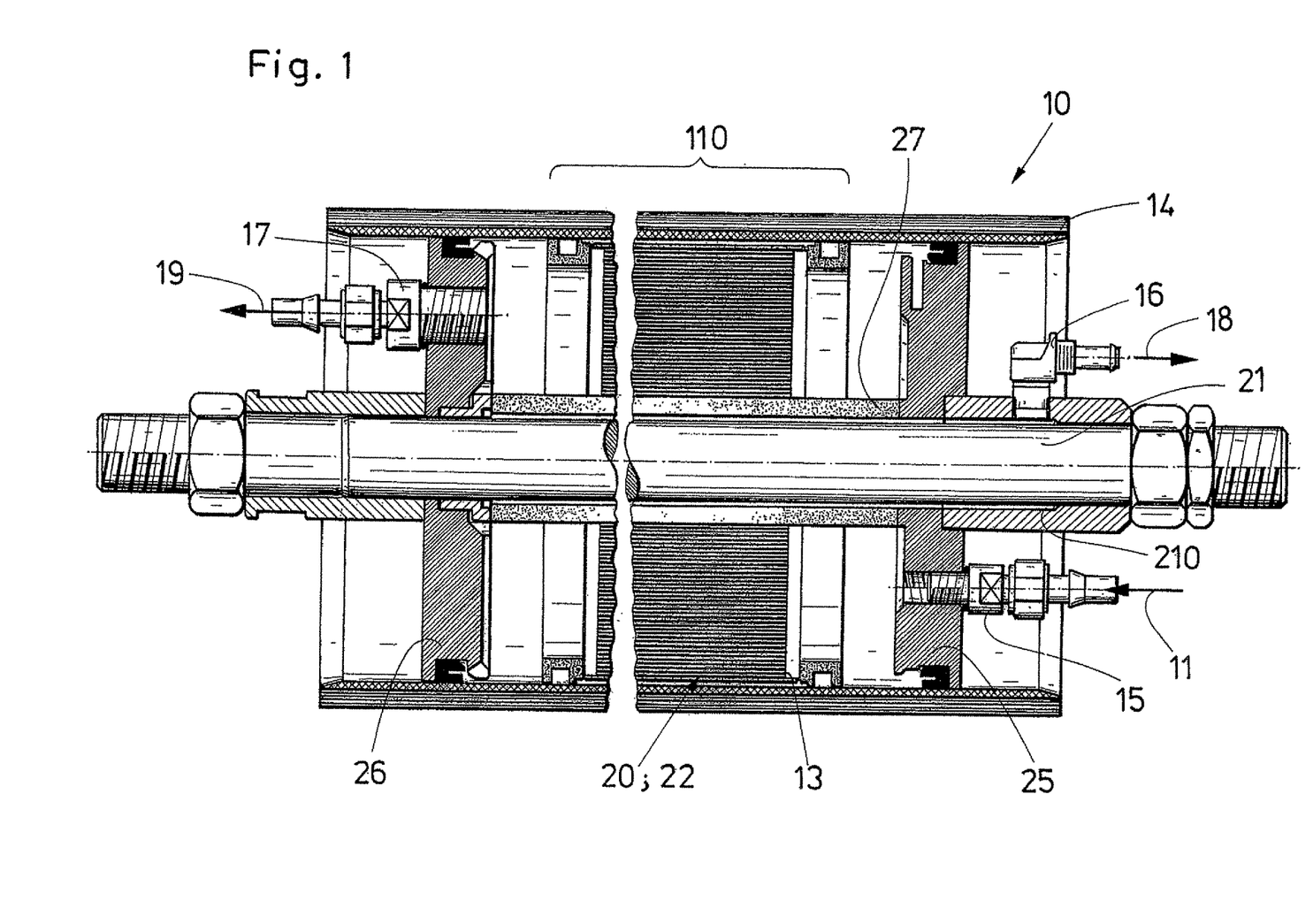
FIG. 1 is a sectional view of the apparatus of the invention.
Figure 2:
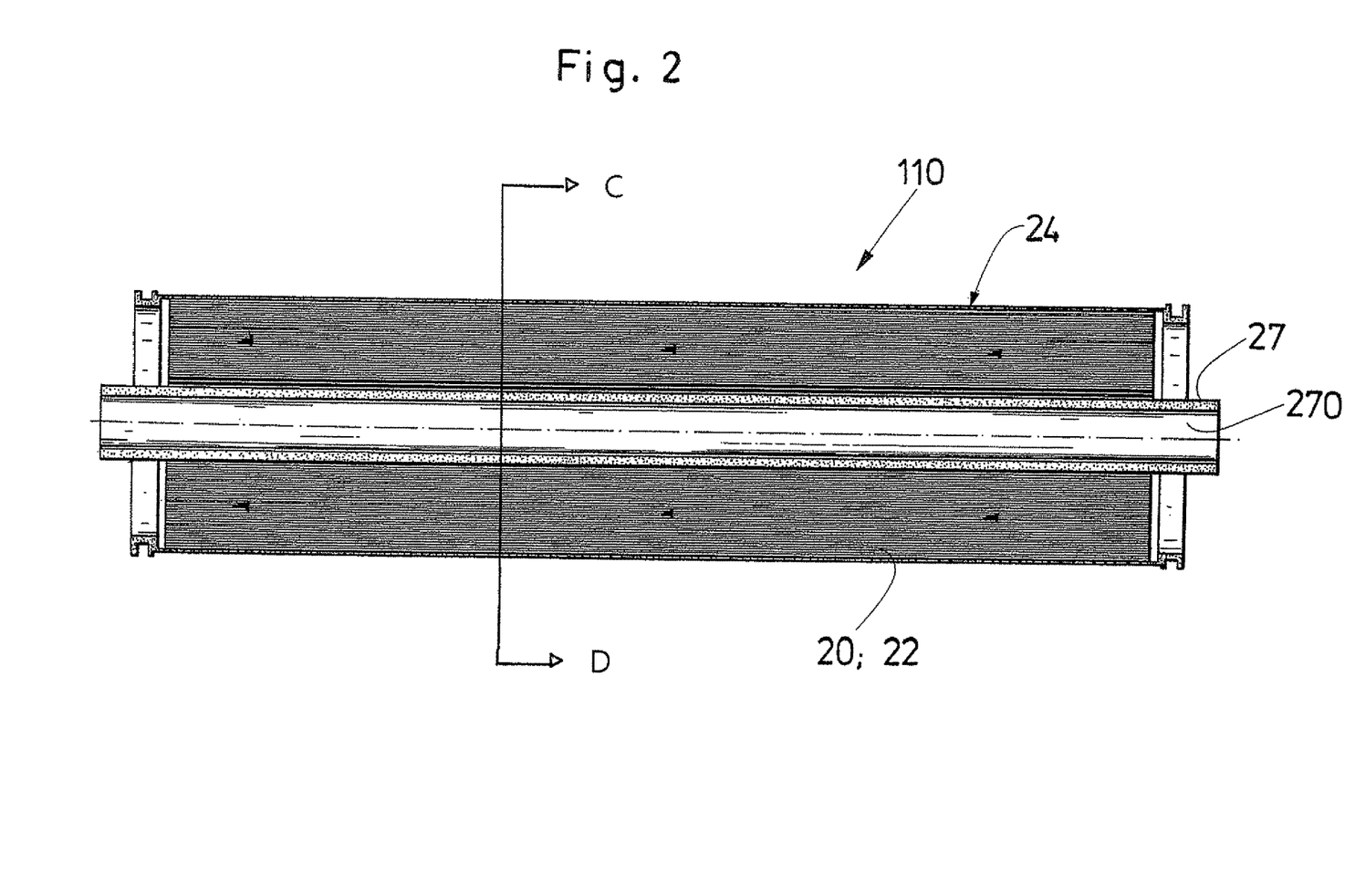
FIG. 2 is a sectional view of the part of the apparatus of FIG. 1 that comprises the spiral, comprising the cushion membranes and spacer elements, which is wound onto a tubular element and onto which the boltlike permeate draining and collection device that essentially traverses the apparatus can be slipped.

For the construction of the apparatus 10, FIGS. 1 and 2 will be referred to first. The apparatus 10 includes a pressuretight housing 14, which is embodied here in the drawings as a tubular cylindrical element. Essentially axially to the housing 14, a permeate draining and collection device 21 is provided, which essentially traverses the apparatus 10 and additionally has the function of a clamping bolt that supports or holds together a separator unit 110, which will be described in detail hereinafter.

Part of the separator unit 110 is shown in FIG. 2; in addition to the permeate draining and collection device 21 traversing the apparatus in boltlike fashion, this separator unit has closure elements 25, 26, which are not shown in FIG. 2, for the sake of simplicity.

A separate tubular element 27 is located on the permeate draining and collection device 21 and can be slipped onto but also slipped off the permeate draining and collection device 21.

Figure 3:
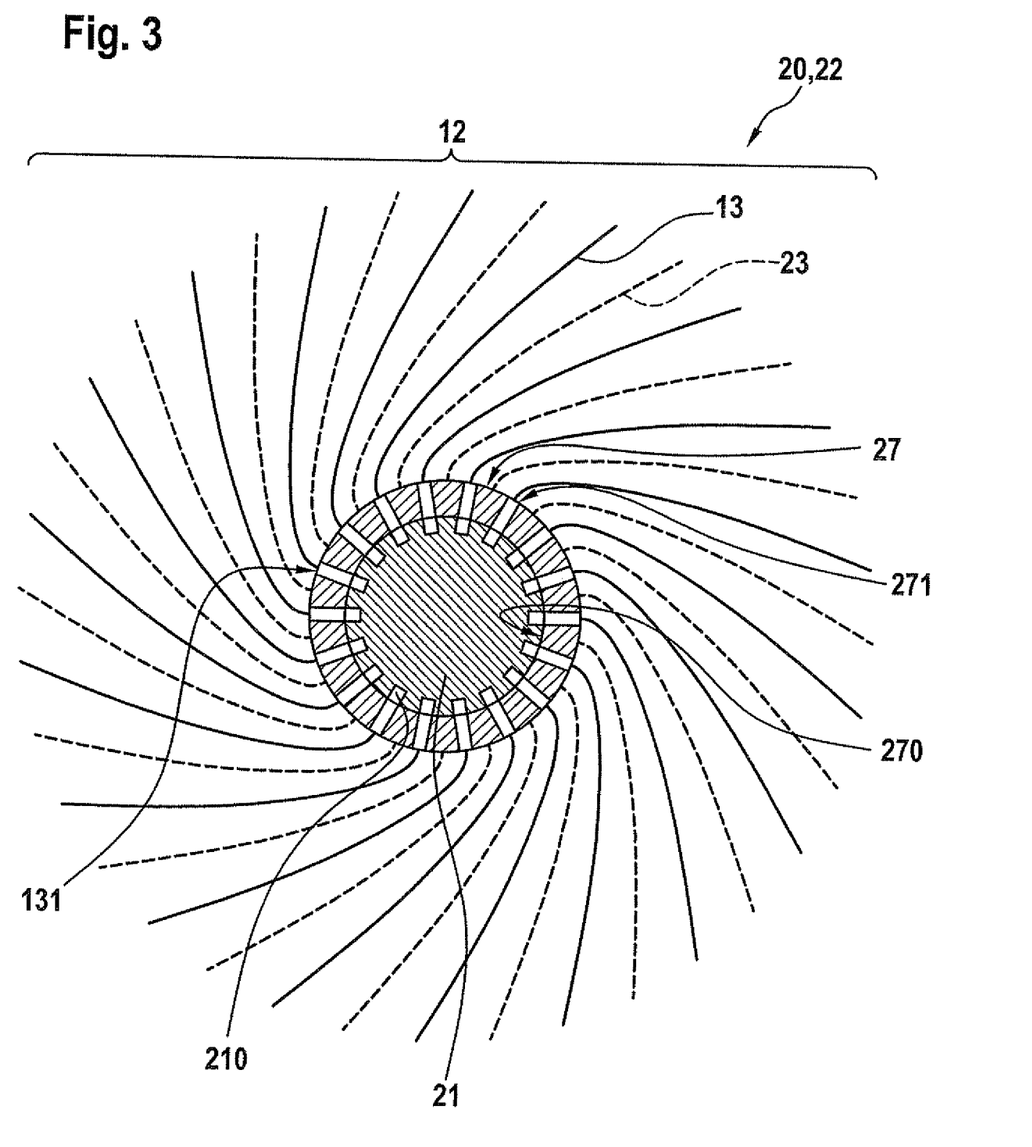
FIG. 3, for explaining the construction of the invention, shows a section through the spirals along the line C-D of FIG. 2, but, compared to FIG. 2, with the permeate draining and collection device inserted into the interior of the tubular element on a larger scale than in FIG. 2, with the membrane cushions not yet wound on, and with spacer elements disposed between the membrane cushions.

A plurality of membranes, which are embodied on the order of membrane cushions 13, are wound in the manner of a multi-element or multilayer spiral 20 onto the separate tubular element 27, which likewise essentially traverses the apparatus 10 and which in its axial length is slightly shorter than the axial length of the housing 14; see also FIG. 3. In FIGS. 1 and 2, the multilayer spiral 20 is shown in its final, fully wound state.

The set of all the membrane elements in FIGS. 1 and 2 forms a membrane stack 12, as shown in FIG. 3 and as will be described in detail hereinafter. The membrane cushions 13 forming the membrane stack 12 are embodied for various separation areas with a view to the flow medium 11 to be separated. That is, part of the membrane stack 12 is formed of membrane elements 13 that are embodied for reverse osmosis, for nanofiltration, for ultrafiltration, of normal filtration, for instance, or also for substance separation by the method of pervaporation.

Certain partial sets of the set of membrane cushions 13 forming the membrane stack 12 can be used in the manner described above for forming the membrane stack 12.

It is also possible to perform a substance separation, given suitable embodied membrane cushions 13, by means of the vacuum-supported method of pervaporation. All combinations of various separation areas of the flow media 11 are possible and can form the spirally constructed membrane stack 12.

The view in FIG. 3, which shows a section through FIG. 2 along the line C-D of FIG. 2 but on a larger scale, shows that unlike what is shown in FIG. 2, the permeate draining and collection device 21 inserted into the inner bore 27 of the tubular element 27, in the non-wound-up state, multi-element spiral 20 comprising individual membrane cushions 13. The membrane cushions, shown in FIG. 3 as a continuous line, are not drawn to scale. In an actual embodiment, the membrane cushions have a width of 950 mm and a length of 755 mm, for example, the length being considered as the effective length of the membrane cushion 13 in the direction of the tubular element 27. The width and length for the membrane cushions cited above relate solely to one possible exemplary embodiment; depending on the variable embodiment of the apparatus 10, completely different widths and lengths of the membrane cushions 13 may also be provided.

In the exemplary embodiment shown in FIG. 3, the multi-element spiral 20 comprises eighteen membrane cushions 13; in this case as well, it must be noted that it is also possible for the spiral 20 to be formed by a different number of membrane cushions 13.

Depending on the type of use desired, the particular partial set selected of the set of membrane cushions 13 that form the membrane stack 12 can thus be assembled in advance with a view to a desired substance separation of flow media 11 of complex composition, or in other word can also be assembled in advance, depending on the qualitatively and quantitatively desired degree of separation to be achieved and on the overall desired outcome of separation.

It should also be noted that the view in FIG. 3 must be understood as merely schematic, for the sake of better comprehension of the apparatus 10. Therefore the individual membrane cushions 13 that form the multi-element spiral 20 are also shown here in a quasi-exploded view.

Figure 5:
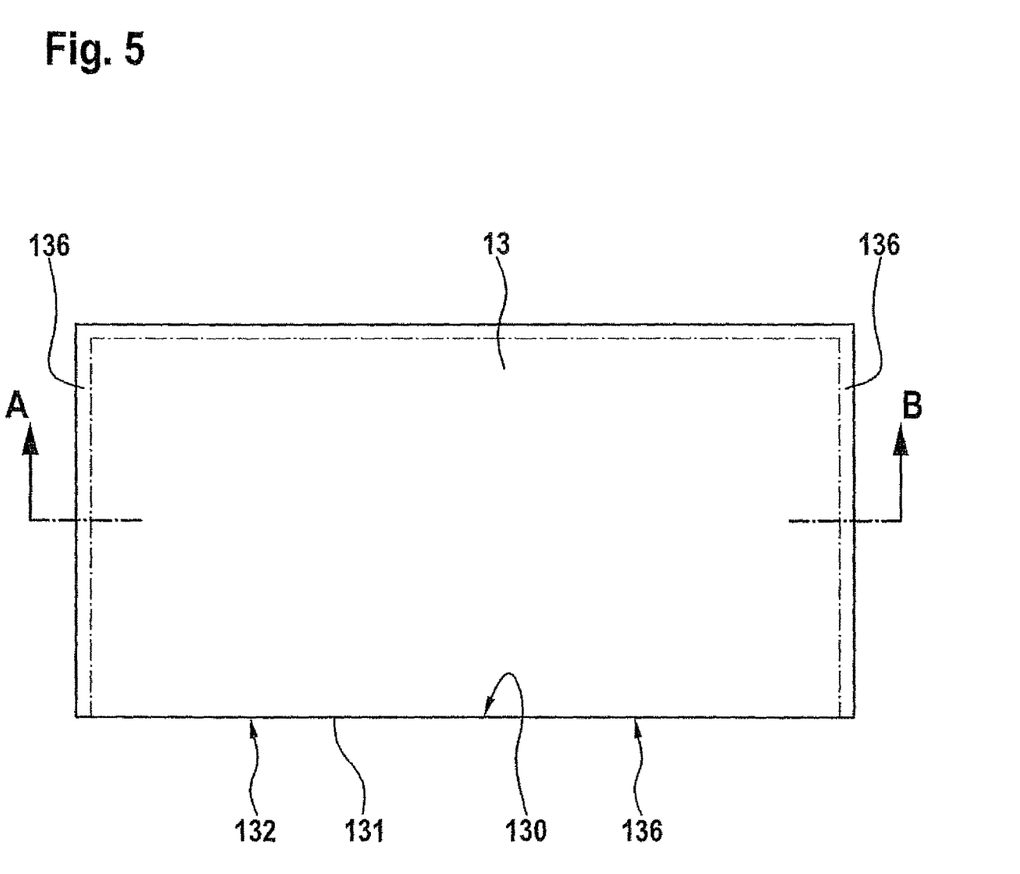
FIG. 5 shows the membrane cushion, used according to the invention, with a region on one side that forms the permeate drain opening.
Figure 6:
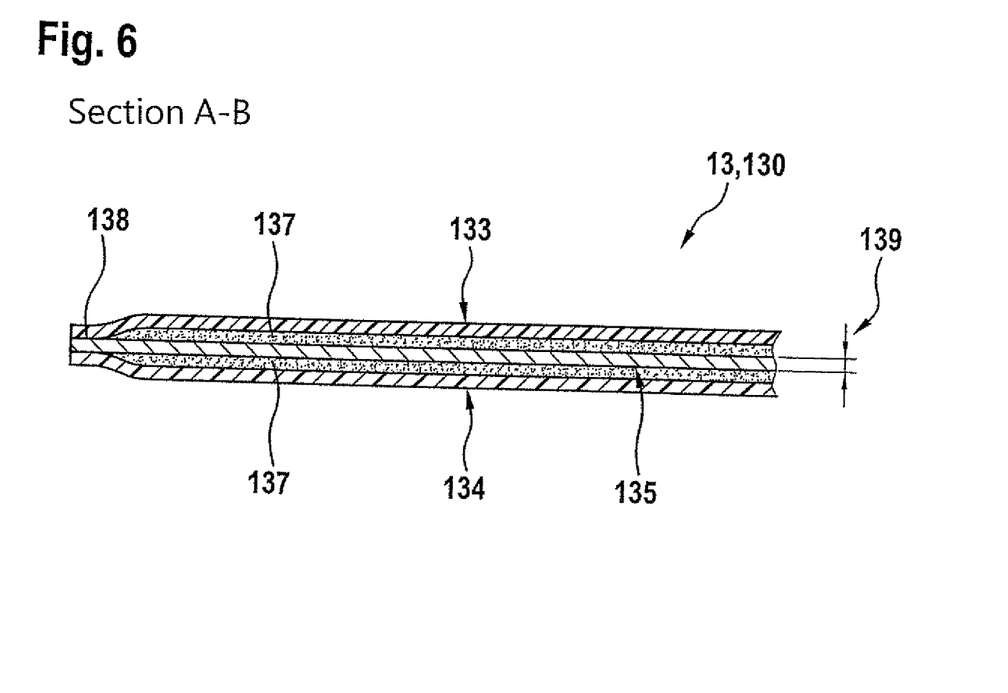
FIG. 6 shows a detail of a section along the line A-B of FIG. 5, showing the construction of a membrane cushion with an intermediate element.
Figure 7:
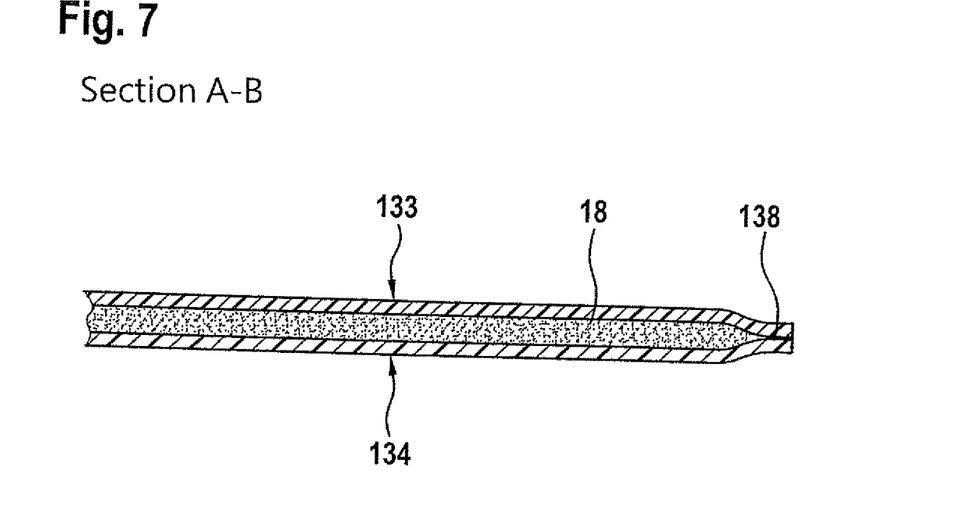
FIG. 7 shows a detail of a section along the line A-B of FIG. 5, showing the construction of the membrane cushion that does not have an intermediate element.

The membrane cushions 13 have a construction as shown in FIGS. 5, 6 and 7, which will be discussed in detail hereinafter. In the finally wound-up state of the multi-element spiral 20, the spiral 20 assumes a shape as shown in section and in side view in FIGS. 1 and 2.

The membrane cushions 13 of the multi-element spiral 20 are disposed relative to the tubular element 27 with its permeate drain openings 131 in such a manner that the permeate drain regions or openings 131 are aligned with or open into the radial holes 271 that are embodied in the tubular element 27; again, see FIG. 3. For instance, the permeate 18, emerging from the permeate drain openings of the membranes 13, can enter the radial holes 271 and through them enter the permeate inlet openings 210 of the permeate draining and collection device 21 that are positioned in the inner bore 270 of the tubular element 27, and from there, since the permeate inlet openings 210 embodied in the form of axial grooves on the permeate inlet openings 210 embodied on the permeate draining and collection device 21 can be guided to an annular channel embodied on one end of the permeate draining and collection device 21, the permeate can reach the outside via a permeate outlet 16.

However, it is also possible, instead of separate groove-like permeate inlet openings 210 between the inner bore 270 of the tubular element 27 and the boltlike permeate draining and collection device 21 essentially traversing the apparatus 10, to provide an annular channel through which the permeate 18 is then carried to the permeate outlet 16.

In the exemplary embodiment of the apparatus 10 described here, eighteen radial holes 271, corresponding to the eighteen membrane cushions 13, are provided in the tubular element 27. Along the separate tubular element 27, a plurality of radial holes 271, corresponding to the length of the membrane cushions 13 and arranged in rows in the axial direction, are provided in order to ensure the most uniform possible outflow of the permeate 18 leaving the membrane cushions 13.

A second multi-element spiral 22 is formed by spacer elements 23, which are disposed such that the membrane cushions 13 forming the multi-element spiral 20 are kept spaced apart from one another by the aforementioned spacer element 23 forming the second multi-element spiral 22. In FIG. 3, in contrast to the membrane cushions 13, the spacer elements 23 are shown in dashed lines.

Figure 4A:
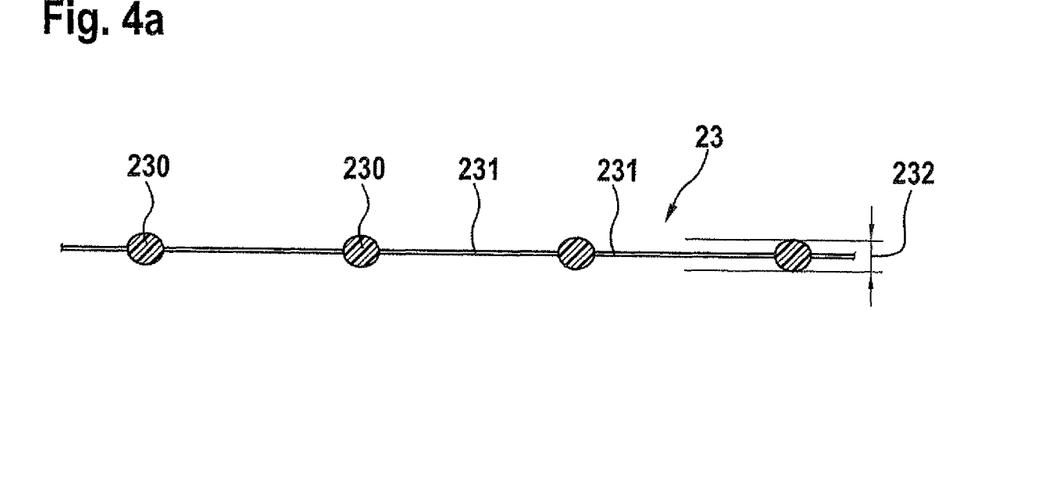
FIG. 4a shows a detail of the spacer element in section, on a much larger scale, in side view.
Figure 4B:
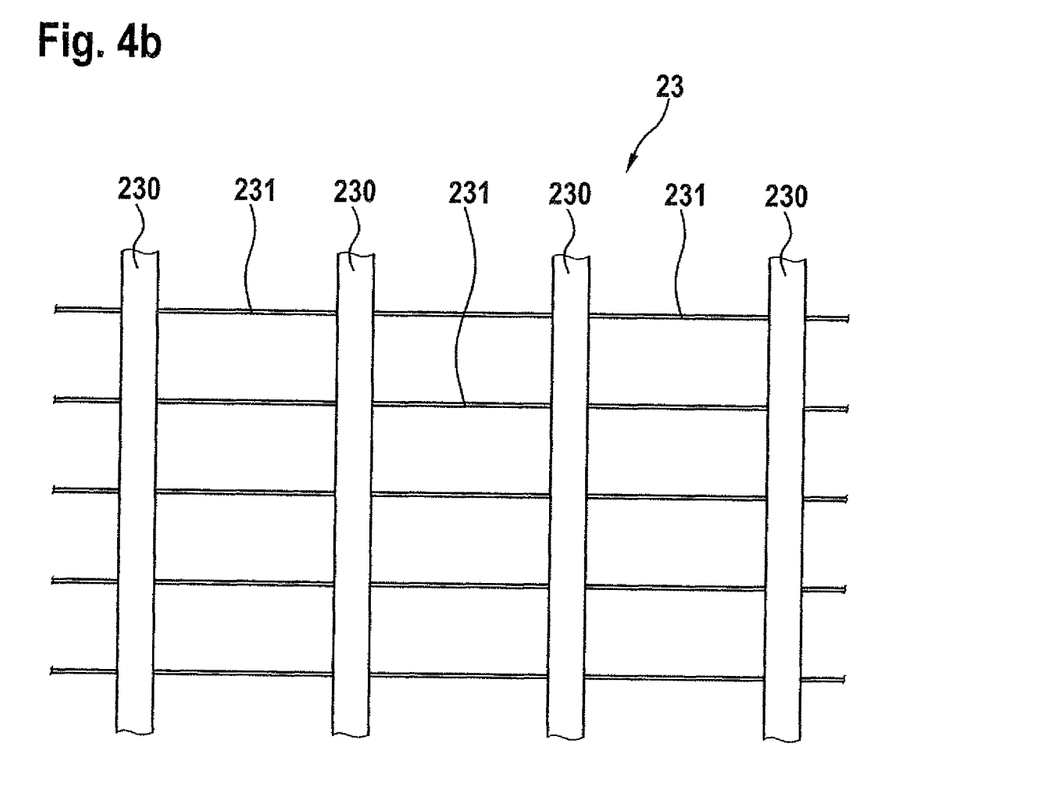
FIG. 4b shows the spacer element in plan view, on a much larger scale.

The spacer elements 23, which have a length and a width approximately equivalent to those of the membrane cushions 13, have a gridlike structure; see FIGS. 4a and 4b. The spacer elements 23 in FIGS. 4a and 4b are shown enlarged, to make the construction of the spacer elements 23 clear. The gridlike structure of the spacer elements 23 is formed by a plurality of first and second elements 230, 231 which intersect one another essentially at right angles. The elements 230, 231 are embodied in rodlike fashion. The first elements 230 are embodied with a larger cross section than the second elements 231. For embodying the second multi-element spiral 22 in the apparatus 10 or relative to the first multi-element spiral 20, the spacer elements 23 are embodied such that the first elements 230 of the spacer elements 23 are oriented essentially axially to the tubular element 27, or to the boltlike permeate draining and collection device 21, so that the flow medium 11 to be separated, which traverses the spirals 20 and 22, can flow along the second elements 231, or in other words presents only a negligibly slight flow resistance to the flow medium 11 to be separated.

The first and second elements 230, 231 of the spacer elements 23, in the exemplary embodiment shown here in FIGS. 4a and 4b, have an essentially circular structure. However, in principle, still other cross-sectional shapes are also possible, for instance if upon overflowing the membrane cushion 13 a turbulent flow through the multi-element spiral 20 of the flow medium 11 to be, separated is intentionally to be attained, which can be necessary for especially desired applications of the apparatus. The spacer elements 23 comprise an elastic material, such as plastic, which may be an elastomer plastic.

Depending on the type of partial set of the membrane cushions 13 formed with a certain set of particular desired membrane cushions 13, it may be provided that the spacer element 23 has a selectable, different thickness 232. By means of the selectable thickness 232 of the spacer element 23, the respective flow channel for the flow medium 11 between two adjacent membrane cushions 13 can be determined, and specifically also as a function of the desired outcome of separation of the flow medium 11 and of the particular separation area desired. Thus in a membrane stack 12, different spacer elements 23, that is, spacer elements with a different thickness 232, can be used as well, including as a function of the particular partial sets of membrane cushions 13 embodied for certain separation areas.

If the first multi-element spiral 20 comprising membrane cushions 13 is put into its final form—see FIGS. 1 and 2—the spacer elements 23 disposed between the membrane cushions 13 conform to the surface of the respective adjacent membrane elements 133, 134 of the respective adjacent membrane cushions 13, but prevent the various membrane elements 133, 134 of the respective adjacent membrane cushions 13 from resting directly on one another, and thus form a flow channel for the flow medium 11 to be separated, so that the flow medium can enter the multi-element spiral 20 of membrane cushions at the face end—see FIG. 1, right—and after sweeping over the entire length of the membrane cushions 13, it can emerge from the multi-element spiral 20 again—see FIG. 1, left. By the provision of the spacer elements 23 positioned between the membrane elements of the first multi-element spiral 20 and likewise forming the second multi-element spiral 22, a flow channel of sufficiently large flow cross section for the flow medium 11 can always be ensured.

If the first and second multi-element spiral 20, 22, which in the example described here would comprises thirty-six elements, or in other words eighteen membrane cushions 13 and eighteen spacer elements 23, is put into its final, wound-up position—see FIGS. 1 and 2—that is, if the membrane cushions 13 then rest on one another with a given intermediate positioning of the spacer elements 23, then the spirals 20, 22 are fixed in their outer circumference—see FIG. 2. This can happen for instance by then winding a filament-like element or a plurality of filament-like elements onto the outer circumference of the spirals 20, 22. To lend the spirals 20, 22 greater strength in the wound-up state, the filamentlike elements can be saturated with a hardenable resin or plastic. By suitable subjection to heat or suitable adjustment of the hardening process, the process of hardening of the resin or plastic, once the spirals 20, 22 have been wound with it, can be induced. However, it is also possible to wrap the spirals 20, 22 on the outer circumference 24 in the manner of a coil, for instance by means of a band of elastomer material.

A thus-completed body comprising the spirals 20, 22, as shown for example in FIG. 2, is then slipped onto the boltlike permeate draining and collection device 21 that traverses the apparatus 10. This body, comprising the multi-element spirals 20, 22 and the tubular element 27, is then provided with closure elements 25, 26 which bound it on both sides and in each of which at least one inlet 15 for the medium 11 to be separated and at least one outlet 17 for the retentate 19 are provided. By suitable sealing means as well as sheathing sleeves, the closure elements 25, 26 are kept in sealing condition relative to the tubular element 27; the closure elements 25, 26 have sealing means with which they can then be positioned in pressuretight fashion relative to the housing 14—see FIG. 1—once the separator unit 110 comprising the spirals 20, 22 of the permeate draining and collection device 20 and the closure elements 25, 26 have been inserted into the housing 14.

The membrane cushions 13 used in the apparatus 10 essentially have a rectangular structure; see FIG. 5.

Membrane cushions 13 of this kind are described in European patent disclosure EP-B 0 129 663 and can be produced in a known manner.

These membrane cushions 13 commonly comprises two membrane elements 133, 134 and as a rule are made form suitable polymer material; the polymers are selected such that they are chosen to suit the particular separation task to be accomplished with the apparatus 10, or in other words are chosen as a function of the flow medium 11 to be separated. At their surrounding edge 136, the two membrane elements 133. 134—see also FIGS. 6 and 7—are welded, for instance by ultrasonic welding, or suitably glued, in a known manner.

The special aspect of the membrane cushion 13 used in conjunction with the apparatus of the invention is that the permeate drain opening 131 is embodied on the membrane cushion 13 at one of its face ends 132, or in other words in a predetermined region, and is aligned with the above-described radial holes 271 of the tubular element 27 in such a manner that the permeate 18 emerging from the membrane cushions 13 via the permeate drain opening 131 can enter the radial holes 271 of the tubular element 27. At least one intermediate element 135 can be disposed in the interior of the membrane cushions 13, or in other words between the membrane elements 133, 134 forming the membrane cushion 13; see the embodiment of the membrane cushion 13 in FIG. 6.

The intermediate element 135 can likewise have a different thickness 139, in order to adapt the hollow space, formed between the two substance-selective membrane layers, optimally to the flow medium 11 to be separated, with a view to the permeate 18 occurring in the membrane cushion 13. Depending on the flow medium 11 to be separated by means of the apparatus 10, by means of the suitable choice of the thickness 139 of the intermediate element 135, a further parameter, in addition to the type of embodiment of the actual membrane and to the suitably selectable thickness 232 of the spacer element 23, exists, which is selectable and which enables an optimal adaptation to the flow medium 11 to be separated. The intermediate element 135 can also have a mechanically stabilizing effect on the membrane cushion 13, and in turn, the set of all the intermediate elements 135 can additionally mechanically stabilize the membrane stack 12 as a whole.

The intermediate element 135 can have a structure similar to nonwoven fabric, as a result of which the permeate can flow or drain more easily to the permeate drain opening 131. Fundamentally, however, it is also possible not to provide any intermediate element 137 between the membrane elements 133, 134; see the embodiment of the membrane cushion 13 in FIG. 7.

The apparatus 10 has been described above in conjunction with a construction of the kind that is generally conventional in spiral or winding membrane modules. The apparatus 10 of the invention and the method of the invention can also be applied in principle to membrane stacks 12 which are embodied on the order of separation devices, in which spacer elements assembled in stacklike fashion, on the order of a cylindrical stack, are provided, each with the interposition of a respective membrane cushion 13; one such apparatus has been described in European patent application EP A 0 289 740 corresponding to U.S. Pat. No. 4,892,657, for example.

Figure 8:
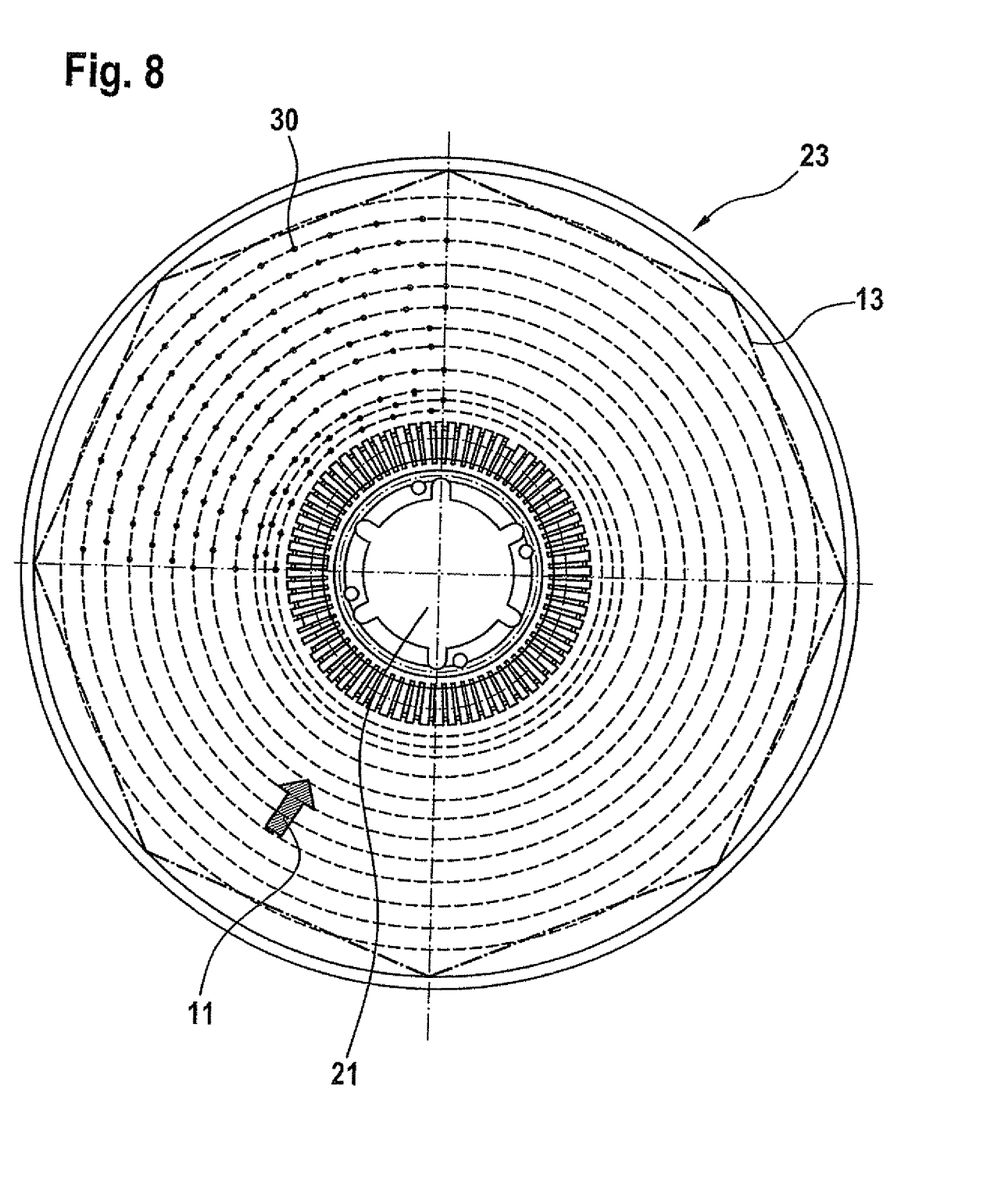
FIG. 8, in plan view, shows a spacer element of the kind used in separation apparatuses that are embodied on the order of an essentially cylindrical membrane stack in which the set of all the spacer elements alternates with the set of all the membrane cushions (second variant of the apparatus of the invention) in plan view, with the membrane cushion indicated.
Figure 9:
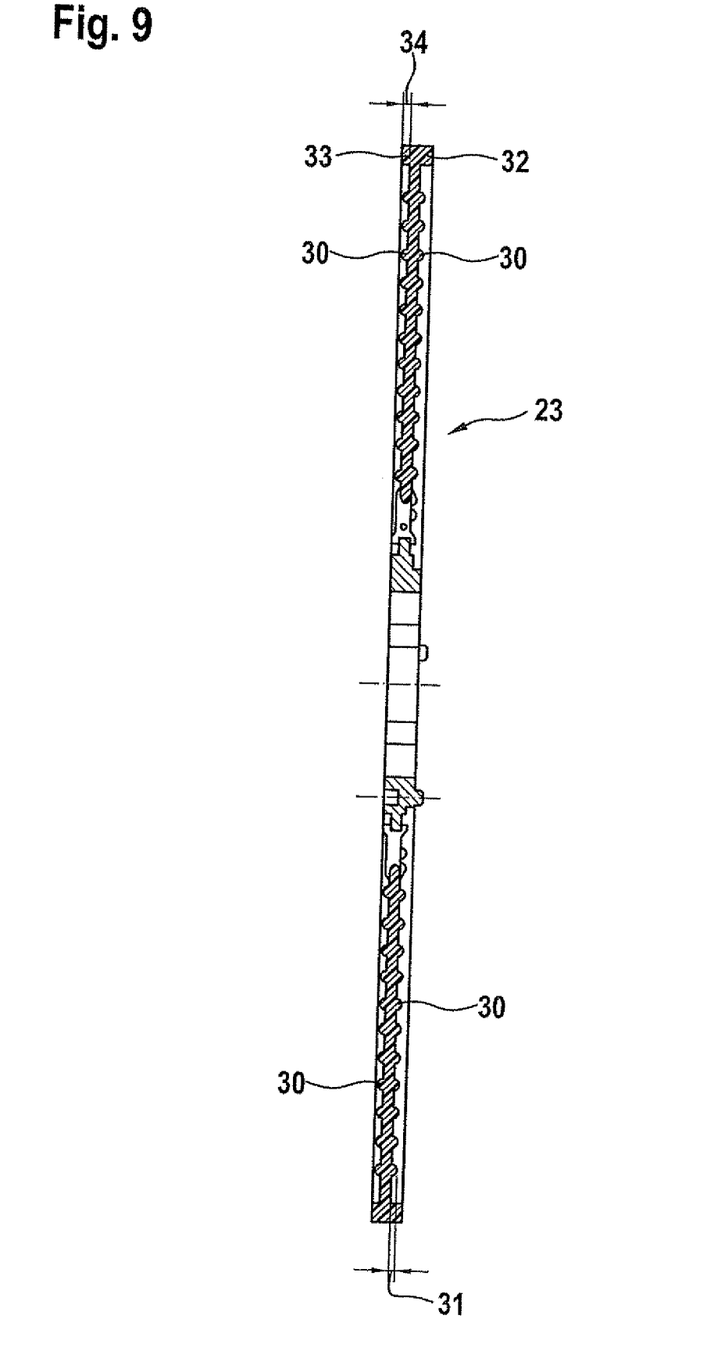
FIG. 9, in a side view, shows the spacer element of FIG. 8 in section, omitting details not needed for comprehension of the apparatus.

One such disklike spacer element is shown as an example in FIGS. 8 and 9, in which the flow medium 11 flows in meandering fashion through a stack of membrane cushions 13 and the planar spacer element 23 from an inlet for the flow medium 11 to an outlet for the retentate. The permeate is collected in a manner known per se in a central permeate draining and collection device 21 and discharged from the apparatus, which is not shown in detail here. The spacer element 23 has two surfaces 28, 29, which are embodied essentially parallel to one another and have a plurality of protrusions 30, the height 31 of which is definitive for the flow channel for the flow medium 11, between each two of which channels a membrane cushion 13 is enclosed. In some embodiments of the spacer element 23, as is known in the prior art, the membrane cushion 12 is merely braced between the tips of the protrusions 30 but does not rest on them, while conversely, in a different spacer element 23, the membrane cushion 12 rests lightly on the protrusion surfaces, embodied parallel and plane to the surface of the spacer elements, at the tip of the protrusions 30.

In general, the apparatus 10, as described above in conjunction with FIGS. 8 and 9, can be provided with membrane cushions 12 and operated as described above in conjunction with the spiral or winding membrane module.

The method of the invention is performed, for instance using an apparatus 10 of the kind that has been described according to the invention, is embodied such that the flow medium 11 is separated by means of membranes 15, in which the apparatus 10 has a substantially pressuretight housing 14 in which a plurality of membranes 13 is disposed, and the at least one inlet 15 for the flow medium 11 carried into the apparatus 10 and to be separated and at least one outlet 13 for the permeate 11 discharged from the apparatus and one outlet 17 for the discharged retentate. The membranes 13 are embodied on the order of membrane cushions, which have an opening region 131 for the emergence of the permeate 18 collecting in the membrane interior 137. The method is carried out such, and the apparatus 10 is constructed such, that respective partial sets of the set of membranes 13, which form a membrane stack 12, are embodied for different separation areas with a view to the flow medium 11 to be separated.

The method and the apparatus are embodied such that for different separation areas of the membranes 13 of the membrane stack 12, they are operated with respective predeterminable, different pressure on the flow medium 11 to be separated. However, it is also possible to subject each of them, for different separation areas, the medium to be separated, to a different, predetermined vacuum, for instance on the permeate side.

LIST OF REFERENCE NUMERALS

10 Apparatus
110 Separator unit
11 Flow medium
12 Membrane stack
13 Membrane/membrane cushion
130 End of membrane cushion
131 Permeate drain opening
132 Face end
133 Membrane element
134 Membrane element
135 Intermediate element
136 Region
137 Membrane interior
138 Edge
139 Thickness of intermediate element
14 Housing
15 Inlet
16 Permeate outlet
17 Permeate outlet
18 Permeate
19 Retentate
20 Spiral (first)
21 Permeate draining and collecting device
210 Permeate inflow opening (permeate draining and collecting device)
22 Spiral (second)
23 Spacer element
230 Rodlike first grid element
231 Rodlike second grid element
232 Thickness of spacer element
24 Outer circumference (spirals)
25 Closure element
26 Closure element
27 Tubular element
270 Inner bore
271 Radial hole
28 Surface
29 Surface
30 Protrusion
31 Height of protrusion
32 Edge
33 Edge
34 Height of edge

The invention claimed is:

1. A method for filtering and separating components of a flow medium by means of membranes in an apparatus having a substantially pressure tight housing in which a plurality of membranes is disposed in a stack to form a membrane stack, comprising introducing the flow medium containing components to be separated into at least one inlet for the flow medium carried into the apparatus and to be separated, and at least one outlet for permeate discharged from the apparatus and at least one outlet for discharged retentate, the membranes in the membrane stack being membrane cushions which have an opening region for emergence of the permeate collecting in the membrane cushions' interior, characterized in that in the membrane stack a first respective partial set of the plurality of membranes forming the stack has different separation techniques than a second partial set of the plurality of membranes forming the stack and are each operated with a predetermined, different pressure of the flow medium to be separated.

2. A method for filtering and separating flow components of a flow medium by means of membranes in an apparatus having a substantially pressure tight housing in which a plurality of membranes is disposed in a stack to form a membrane stack; comprising introducing the flow medium containing the flow components to be separated, into at least one inlet for the flow medium carried into the apparatus and to be separated; and at least one outlet for permeate discharged from the apparatus and at least one outlet for discharged retentate, the membranes forming the membrane stack being membrane cushions which have an opening region for emergence of the permeate collecting in the membrane cushions' interior, characterized in that in the membrane stack a respective first partial set of the plurality of membranes forming the stack and relying on different separation properties than a second partial set of membranes in the stack and are each operated with a predetermined, different vacuum on the at least one outlet for permeate discharge from the apparatus.

3. The method of claim 2, characterized in that the first partial set of the plurality of membranes forming the membrane stack is operated with a different high vacuum than the second partial set of membranes in the stack based on the flow medium to be separated.

4. The method of claim 2, characterized in that the first partial set of the plurality of the membranes of the membrane stack is subjected to a differently high vacuum, and the second partial set of membranes in the membrane stack is subjected to different pressure based on the flow medium to be separated.

5. An apparatus (10) for filtering and separating components of a flow medium (11) by means of membranes (13), including a substantially pressure-tight housing (14) in which a plurality of membranes (13) is disposed in a stack, at least one inlet (15) for the flow medium (11) carried into the apparatus (10) and to be separated, and at least one outlet (16) for permeate (18) discharged from the apparatus (10) and an outlet (17) for discharged retentate (19), the membranes (13) being membrane cushions which have an opening region (131) for emergence of the permeate (18) collecting in the membrane cushions' interior (137), characterized in that each respective partial set of the plurality of membranes (13), which form a membrane stack (12), have different separation techniques from each other partial set based on the flow medium (11) to be separated in the partial set of the plurality of membranes forming the stack.

6. The apparatus of claim 5, characterized in that the membrane stack (12) is in the form of a multilayer spiral (20).

7. The apparatus of claim 5, characterized in that in the interior (137) of the membrane cushion (13), at least one intermediate element (135) is disposed between substance-selective membrane elements (133, 134).

8. The apparatus of claim 7, characterized in that the intermediate element is a substantially planar intermediate element (135) which has a different thickness (139) that can be selected in accordance with a separation technique of the different separation techniques of the membrane cushion (13).

9. The apparatus of claim 8, characterized in that spacer elements (23), through which the flow medium (11) to be separated can flow substantially unhindered, are disposed between the membrane cushions (13) forming the membrane stack (12).

10. The apparatus of claim 9, characterized in that the spacer elements are substantially planar elements (23) having a different thickness (232), which can be selected in accordance with the separation technique of at least both sides of an adjacent membrane cushion (13).

11. The apparatus of claim 10, characterized in that the membrane cushions (13) forming the membrane stack (12) are wound forming a spiral (22) around a permeate and collection device (21) extending across the apparatus (10), in such a manner that the opening region (136) of the membrane cushion (13) is in communication with corresponding permeate drain openings (210) of the permeate draining and collection device (21).

12. The apparatus of claim 11, characterized in that the membrane stack (12), embodied in the form of the spiral (22), is wound onto a separate tubular element (27), and the permeate draining and collection device (21) is received in an inner bore (270) of the separate tubular element.

13. The apparatus of claim 5, characterized in that the membrane stack (12) is formed by a set of alternatingly stacked, disklike spacer elements (23) and the membrane cushions (13).

14. The apparatus of claim 13, characterized in that on at least one surface (28, 29) of the disklike spacer elements, a plurality of protrusions (30) protruding away from the at least one surface (28, 29) are provided.

15. The apparatus of claim 14, characterized in that a functional thickness (232) of the disklike spacer elements (23) is defined by the height (31) of the protrusions (30).

16. The apparatus of claim 15, characterized in that the disklike spacer element (23) has at least one outer encompassing edge (32, 33) each protruding away from the surface (28, 29), and the functional thickness (232) of the spacer element (23) is defined by the height (34) of the edge (32, 33).

17. The apparatus of claim 6 characterized in that in the interior (137) of the membrane cushion (13), at least one intermediate element (135) is disposed between substance-selective membrane elements (133, 134).

* * * * *